United States Patent [19]

Scholz et al.

[11] Patent Number: 4,740,335

[45] Date of Patent: Apr. 26, 1988

[54] PROCESS FOR PRODUCING A DEEP-DRAWN ARTICLE FROM A PARTIALLY-CRYSTALLINE POLYMERIC MATERIAL

[75] Inventors: Hans-Günter Scholz, Grosssachsen; Gerhard Graab, Mannheim, both of Fed. Rep. of Germany

[73] Assignee: Firma Carl Freudenberg, Weinheim/Bergstr., Fed. Rep. of Germany

[21] Appl. No.: 892,942

[22] Filed: Aug. 4, 1986

[30] Foreign Application Priority Data

Aug. 10, 1985 [DE] Fed. Rep. of Germany ....... 3528810

[51] Int. Cl.⁴ .................. B29C 35/08; B29C 51/00
[52] U.S. Cl. ................... 264/22; 264/210.2; 264/210.3; 264/235; 264/236; 264/237; 264/284; 264/292; 264/293; 264/294; 264/322; 264/544; 264/DIG. 65; 425/174; 522/158
[58] Field of Search .............. 264/22, 210.2, 210.3, 264/284, 292, 293, 294, 322, 331.17, 346, 348, 544, 230, 236, DIG. 65, 235, 237; 522/158; 425/174, 385, 387.1

[56] References Cited

U.S. PATENT DOCUMENTS

| | | |
|---|---|---|
| 3,270,104 | 8/1966 | Dreyfus et al. . |
| 3,333,032 | 7/1967 | Dickinson ............................ 264/22 |
| 3,563,973 | 2/1971 | Arditti et al. ...................... 264/22 X |
| 3,872,194 | 3/1975 | Lowry et al. ........................ 264/22 |
| 3,932,575 | 1/1976 | Andersson ....................... 264/292 X |
| 4,122,137 | 10/1978 | Bohm et al. ........................... 264/22 |
| 4,226,687 | 10/1980 | Sasaki et al. ..................... 522/158 X |
| 4,419,320 | 12/1983 | Perkins et al. .................. 264/292 X |
| 4,489,034 | 12/1984 | Davison . |

FOREIGN PATENT DOCUMENTS

| | | |
|---|---|---|
| 0010646 | 8/1979 | European Pat. Off. . |
| 2026427 | 5/1970 | Fed. Rep. of Germany . |
| 2539889 | 1/1976 | Fed. Rep. of Germany . |
| 2455882 | 8/1976 | Fed. Rep. of Germany ...... 264/284 |
| 1212740 | 10/1959 | France . |
| 57-84836 | 5/1982 | Japan ..................................... 264/22 |
| 1396573 | 6/1975 | United Kingdom . |

Primary Examiner—Jeffery Thurlow
Assistant Examiner—Leo B. Tentoni
Attorney, Agent, or Firm—Felfe & Lynch

[57] ABSTRACT

A process for producing a surface-embossed, deep-drawn article suitable for an interior finish or lining of a motor vehicle, for example, starts with a partially-crystalline polymeric material, i.e., one having crystallites, in film form. The film-form material is heated to a temperature below the melting point of its crystallites an surface embossed. The embossed material is then cooled and crosslinked. The crosslinking is preferably done by irradiating the cooled material with a high-energy beam such as an accelerated electron beam, for example. The cooled and crosslinked material is then reheated, this time to a temperature above the melting point of its crystallites, and deep drawn into the shape of the article.

15 Claims, 1 Drawing Sheet

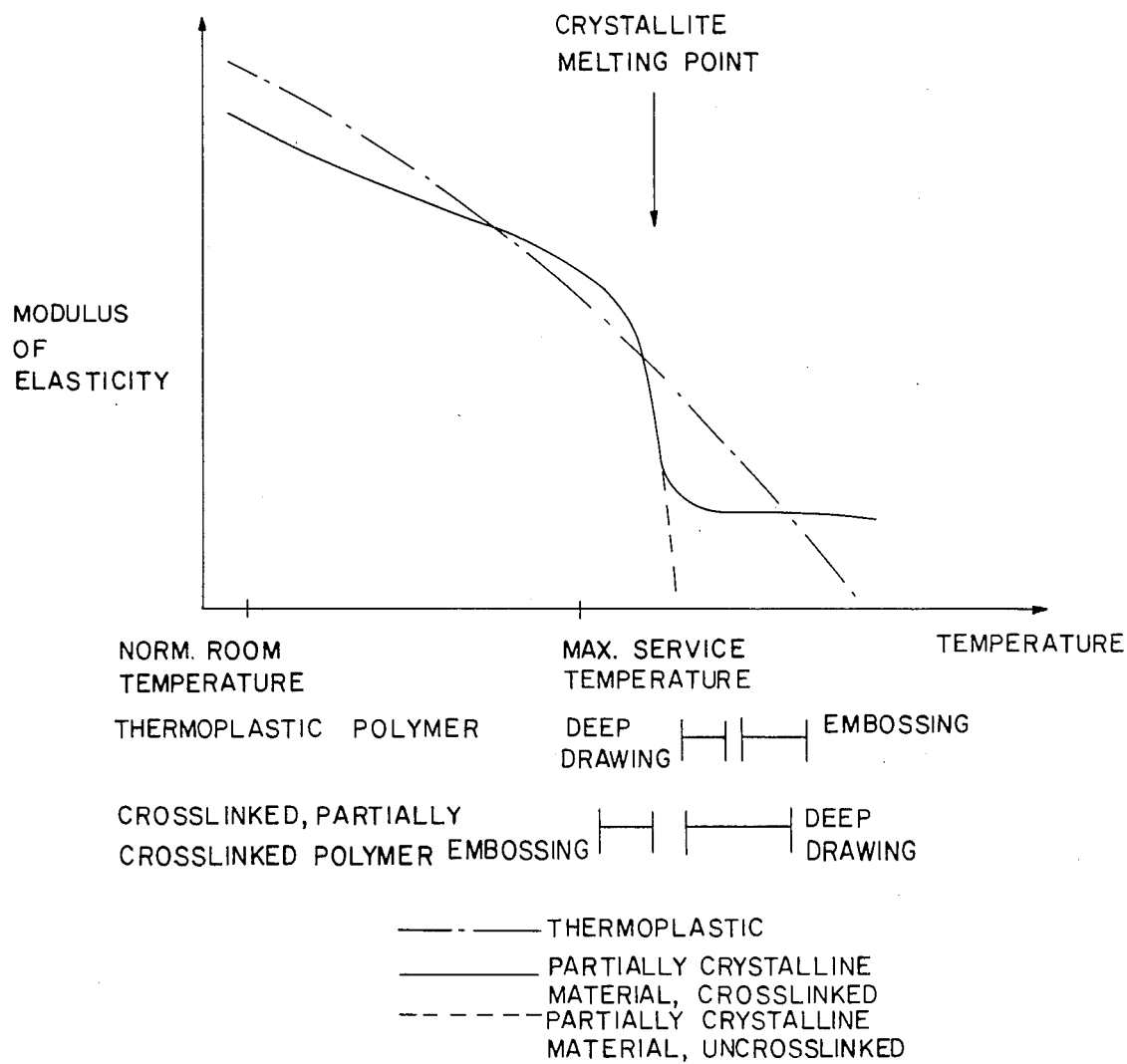

PROCESS FOR PRODUCING A DEEP-DRAWN ARTICLE FROM A PARTIALLY-CRYSTALLINE POLYMERIC MATERIAL

BACKGROUND OF THE INVENTION

The invention relates to a process for producing a deep-drawn article from a partially-crystalline polymeric material, i.e., one having crystallites and, more particularly, a process in which the material is provided in film form, heated to a temperature below the melting point of its crystallites, embossed with a surface pattern while so heated, cooled, crosslinked, reheated, this time to a temperature above the melting point of its crystallites, and deep drawn into the shape of the article.

Deep-drawn articles are often used as an interior finish or lining in motor vehicles. These are generally made from sheet material deep drawn into the shape of the finish or lining article.

The sheet material heretofore generally consisted substantially of polyvinyl chloride (PVC) or a mixture of acrylonitrile-butadiene-styrene copolymers (ABS) with PVC. A variety of modifications of such sheet material are made with soft or hard PVC. Such sheet material, or laminates thereof, is generally used as a film, meaning herein a sheet thickness of from about 500 micrometers to about 1400 micrometers and, preferably, of from about 600 micrometers to about 1200 micrometers. Such sheet material has a number of disadvantages.

If the sheet material was plasticizer free, like films of ABS and hard PVC, for example, it had the disadvantages in deep drawing and use of excessive stiffness and too low a flexibility at low temperatures, for example. These were sufficient that plasticizer was generally used.

If the sheet material contained plasticizers, however, the plasticizer tended to separate from the sheet material over time, especially if heated. In use, when heating could not always be controlled, the separated plasticizer condensed on the windshield of the motor vehicle, resulting in so-called "fogging", which clearly was undesirable. The separation of the plasticizer also gradually reduced the elongation characteristics of the sheet material in so-called heat aging which could impair its flexibility for deep drawing and, especially at low temperature, use.

The above-described disadvantages of plasticized sheet materials increase as the instantaneous and/or time-average ambient temperature about the sheet material increases. Such results for fogging and heat aging, as well as further disadvantages from similarly-reduced ozone resistance and light stability, can be measured.

Nevertheless, in the motor vehicle industry at the present time, especially for passenger cars, there is a trend toward lowering the air drag coefficient as much as possible for fuel economy. This has led to, among other things, a very low angle of inclination of the front windshield. Solar irradiation then heats the passenger compartment more to affect more deep-drawn interior linings and finishes therein as described and, especially, a dashboard lining which is particularly desirable to deep draw. The plasticizer problem has become, consequently, more pronounced than heretofore.

Accordingly, prior efforts have been made to avoid the known disadvantages of plasticized PVC film and like sheet material for deep-drawn articles, such as for example, by improving aging resistance, providing a higher degree of softness without the occurrence of fogging, limiting the loss of elongation characteristics over the useful life time of the material, providing good light stability, and increasing ozone resistance. Any of these would improve the deep-drawing characteristics of the material for motor vehicle use.

Some of the prior efforts propose the use of conventional PVC-ABS mixtures and attempt to eliminate the above-stated problems by adding polymeric plasticizers and other modifying resins, such as, for example, styrene-acrylonitrile copolymer (SAN) and/or acrylonitrile-butadiene resin (NBR). Such a proposal is to be found, for example, in German Federal Utility Model publication No. G 82 20 682.

It is also known to use partially-crystalline polymeric materials, i.e., those having crystallites, such as polypropylene, ethylene-propylene-diene copolymers (EPDM), ethylene-propylene copolymers (EPM) and polyamides, for example, in the automotive industry. Such materials can be used uncrosslinked by injection- or blow-molding processes, for example, or crosslinked by pressing processes, for example. In all the processes of making automotive products therefrom, at least generally, however, temperatures above the melting point of the crystallites of the material are reached.

Films of crosslinked or uncrosslinked EPDM and EPM copolymers would satisfy some of the above-described requirements for making deep-drawn automotive articles. They have good light stability, good cold flexibility, low fogging and good impact strength, for example. They have been used, at least primarily, however, only in the packaging industry in which, however, deep-drawn products are also made.

In deep-drawn packaging products from such films, the temperature of the material is always below the crystallite melting point in order to avoid decomposing the film. Moreover, the packaging and other products deep drawn from such films have not been embossed, as desired for a lining for a motor vehicle interior, and for economic and technical reasons understood in the known art, it is highly problematic that such could be done.

Economically, this is because a deep-drawing die having a surface texture corresponding to the texture to be embossed on the surface of the product would be required. This involves extremely high die-making and die-repairing costs (as well as technical difficulties for die repairs particularly). Moreover, all of the positive deep-drawing process equipment now used almost exclusively in manufacturing products for the interior of motor vehicles would have to be converted to equipment for the more-complicated negative process. In addition to the expense of new, more-complicated negative process equipment, products requiring great stretching and/or deep undercutting are more difficult to make on negative process equipment and this is often inimical to the styling concerns of automotive product designers.

Technically, the high, sun-produced temperatures which can occur at the dashboard, for example, of a modern, low-drag automobile having a windshield with low rake angle can produce considerable shrinkage if it is made from a sheet of partially crystalline material deep drawn below its crystallite melting point, as heretofore practiced. This is especially true if the sun-produced temperature of the dashboard reaches or nears the temperature of the material during the deep-drawing process. Such shrinkage can result in an undesirable deformation of the dashboard, even if it is foam backed.

In the case of moldings consisting of a mixture of PVC and ABS, attempts have been made to solve the solar-deformation problem by seeking, in the composition of the mixture, a compromise between good flow characteristics in the deep-drawing process, on the one hand, and high temperature stability and hardness of the sheet material used, on the other hand.

It is also known, from German patent publication AS No. 31 07 907, for example, that webs of partially-crystalline plastics including, especially, for example, EPDM and EPM copolymers, can be shaped into a product and then wholly or partially be crosslinked for fixing by "freezing." This process is applied in the production of so-called "shrinkables" utilizing the "elastic memory" of the crosslinked, partially-crystalline material, however, because a product so made rapidly shrinks back to the original shape and dimensions of the material when even briefly heated above the melting point of the crystallites of its material. This is not desirable, as before described, for a deep-drawn molding used as an interior finish or lining of an automobile.

SUMMARY OF THE INVENTION

Accordingly, it is an object of the invention to provide a process which avoids the disadvantages described above by being simple to practice and permitting the production of a deep-drawn article from a partially-crystalline polymeric material which, when used as a dashboard covering in a motor vehicle, for example, well withstands all of the stresses to which it is exposed for long periods of time without undesirable alteration of fogging.

To this and other ends, the invention provides a process for producing a surface-embossed, deep-drawn article which is suitable for use as an interior finish or lining of a motor vehicle, for example. For the process, a partially-crystalline polymeric material, i.e., one having crystallites, is provided in film form. The material is heated to a temperature below the melting point of its crystallites and surface embossed. The embossed material is then cooled and crosslinked. The crosslinking is preferably done by irradiating the cooled material with a high-energy beam such as an accelerated electron beam, for example. The cooled and crosslinked material is then reheated, this time to a temperature above the melting point of its crystallites, and deep drawn into the shape of an article.

In the process of the invention, as in processes of the state of the art, the film-form partially-crystalline material is preferably EPDM or EPM. The temperature below the crystallite melting point to which the material is first heated is, preferably, just below that temperature. The surface texture given by embossing can be, for example, a leather-like grain texture. The embossed material is, preferably, cooled before irradiation with the preferred high-energy beam for crosslinking. After this, the surface texture produced by the previous embossing is retained, surprisingly, even though the material is reheated for the deep-drawing process to a temperature above the crystallite melting point and, therefore, higher than the temperature during the preceding embossing process. An additional advantage is also possible in that the deep-drawing conditions can be kept virtually constant, within a materially-expanded temperature range, which makes the deep drawing substantially easier to control and supervise.

DESCRIPTION OF THE DRAWING

These and other differences and advantages of a merely-illustrative, preferred process of the invention over the conventional processes will now be explained further with the aid of the appended diagram of modulus of elasticity as a function of temperature.

DESCRIPTION OF THE PREFERRED PROCESSES

As shown in the diagram, the modulus of elasticity of a thermoplastic material decreases more or less constantly with increasing temperature. Thermoplastic materials are, therefore, conventionally deep drawn or embossed in a temperature range in which the material has a low elasticity modulus and, hence, easy deformability. The upper limit of this temperature range is determined by the inherent strength of the particular thermoplastic material and its thermal stability.

On account of the "memory" capacity of the macromolecules of thermoplastics, and their meltability, it is necessary that the temperature of a thermoplastic be higher during embossing than during subsequent deep drawing into the shape of an article. If this were not done, the surface configuration previously produced by the embossing would be substantially lowered or destroyed during the subsequent deep-drawing operation.

Uncrosslinked partially-crystalline polymers in film form can be embossed or deep drawn only at temperatures below the melting point of their crystallites, because the modulus of elasticity decreases at this temperature on a steep curve to the insignificant modulus of the melted material having too low a viscosity for the processes. Surprisingly, however, crosslinked partially-crystalline polymers initially exhibit a comparably-steep decrease in their modulus of elasticity at the melting-point temperature of their crystallites but, thereafter, exhibit a relatively constant modulus over a wide range of higher temperatures. This is probably caused by their content of crosslinked molecules. The actual modulus of elasticity above the crystallite melting point depends on the degree of crosslinking in the material used, and it can be controlled, therefore, by controlling the crosslinking. However, it gives the crosslinked partially-crystalline material a rubber-elastic, infusible character over the higher temperature range in question.

As a result, even though the temperature is lower and the modulus of elasticity higher during the embossing than during a subsequent deep-drawing operation, a surface texture produced by embossing the film before crosslinking is retained. It is surmised that, on account of the crosslinking of the macromolecules of the material, their reorientation is difficult, even above the crystallite melting point and that, therefore, in the second shaping, i.e., deep-drawing, operation, only the "skeleton" of the crosslinked polymer chains is elongated. This surmise has been supported by a series of experiments in which the degree of crosslinking and other conditions were varied as indicated in Table 1 for the results also indicated.

TABLE 1

| A | B | C | Results: embossed grain quality after deep drawing |
|---|---|---|---|
| 135 | 50 | 175 | — |
| 140 | " | " | 0 |
| 150 | " | " | ++ |
| 155 | " | " | ++ |

TABLE 1-continued

| A | B | C | Results: embossed grain quality after deep drawing |
|---|---|---|---|
| 160 | " | " | rent during embossing |
| 150 | 10 | 175 | not deep-drawable |
| " | 20 | " | — |
| " | 50 | " | ++ |
| " | 70 | " | ++ |
| " | 100 | " | too diminished stretchability |
| 150 | 50 | 160 | — |
| " | " | 170 | ++ |
| " | " | 175 | ++ |
| " | " | 180 | ++ |
| " | " | 190 | surface glazed |
| " | " | 200 | surface burnt |

In Table 1, column A gives grain-embossing temperature in °C., column B gives crosslinking irradiation doses in kGy, and column C gives deep-drawing temperature in °C.

In the Results column of Table 1, "—" indicates poor embossed grain quality, "0" indicates marginal quality, and "++" indicates acceptable quality after deep drawing.

For the experiments reported in Table 1, an electron accelerator with an output of 1.5 MeV was used for the crosslinking irradiation. The use of other high-energy radiation for the crosslinking would have been quite feasible, however. The doses of crosslinking irradiation ranged from 10 to 100 kilograys (kGy). At 10 kGy, however, insufficient material strength was obtained above the crystallite melting point to permit the next, deep-drawing operation.

Crosslinking irradiation doses of from about 20 to about 50 kGy produced deep-drawable material but, evidently, the number of crosslinked molecules was not great enough. The result was, therefore, an unsatisfactory modification of the embossed surface configuration during the deep drawing.

In the one case in which the crosslinking irradiation dose was 100 kGy, evidently too many crosslinking points between the macromolecules resulted. This produced so great a loss of stretchability that, at the extreme-shaping points of the subsequent deep-drawing process, rupture of the film resulted.

The appropriate crosslinking irradiation dose must be determined, therefore, from case to case. Specific properties of the material and its embossing temperature can result in great differences as shown in Table 1. Crosslinking irradiation doses of from about 40 to about 80 kGy have, however, produced good results, as a rule, for appropriate materials with other appropriate conditions of the process in embossing, for example.

Thus, in spite of the crosslinking, the temperature of the material in the embossing process still has an influence on the surface configuration after the deep drawing. Beginning at the crystallite melting temperature, a decidedly poorer result is obtained as the embossing temperature is reduced. This is probably attributable to the fact that the irradiation results preferentially, if not exclusively, in a crosslinking of the molecule parts which have been modified thermoplastically by the preceding embossing operation. The portions of the film that have been only thermoelastically deformed during embossing have a different "remember-ability," namely, that of the unembossed film. Some effect of the embossing temperature is shown in Table 1.

Some effect of variation of the temperatures of the material during deep-drawing is also shown in Table 1. This also shows, however, that the deep-drawing temperature can be varied within a reasonably-wide range (e.g., at least from 170° to 180° C.) without resulting in any fundamental effect on the stability of the texture previously embossed into the surface of the film.

A film of any partially-crystalline polymeric material can be used for the process. Polymeric materials on the basis of EPDM or EPM mixed polymers and copolymers are, however, preferred. These can be modified to satisfy specific requirements, for example for a particular Shore hardness, antifogging characteristic, elasticity, aging resistance, etc. The crystallite melting temperatures of all these materials are above about 130° C. and, preferably, from about 150° to about 165° C. An example of a material that is especially suitable for the production of an embossed and deep-drawn article for use as a dashboard covering in a modern motor car is:
28.57 wt.-parts ethylene-propylene-diene terpolymer
42.86 wt.-parts polypropylene (MFI 190/5=3)
16.19 wt.-parts phenylene oxide
11.43 wt.-parts styrene-ethylene-butylene-styrene block copolymer
0.95 wt.-parts antioxidants.

These components were homogenized and plasticized in an extruder, and extruded above about 170° C through a wide-slotted nozzle into a smoothing mechanism, for example, a calender. The resulting film had a thickness of about 0.9 mm and was then passed over cooling rolls and wound.

A sheet of such film was heated in an infrared radiation field to a surface temperature of about 155° C and roller embossed with a leather-like texture, the embossing rate being 5 meters per minute. For commercially-efficient production, however, the embossing could be performed in a single operation with the extrusion and smoothing, prior to cooling.

The embossed film was then irradiated with a radiation dose of 60 kGy from an electron accelerator for crosslinking. Other substantially high-energy radiation would also have been suitable as the crosslinking initiator, but beta radiation from an electron accelerator is preferred.

The measurements listed in Table 2 were made on this irradiated film. Comparison with the current technical specifications of the most important German automobile manufacturers shows that before and, especially, after thermal aging, as well as after directional testing, the film satisfies and, in some cases, especially in its mechanical ratings, definitely exceeds the specifications.

TABLE 2

| TESTS | | Test Values |
|---|---|---|
| Weight per unit area | g/m$^2$ | 833 |
| Apparent density | g/cm$^3$ | 0.93 |
| Shore hardness | A/D | 92/45 |
| Stress in MPa. after long./trans. extension of | | |
| 20%, | | 11.5/9.9 |
| 100%, and | | 11.6/10.2 |
| 300% | | 14.3/13.1 |
| Tensile strength | MPa | 23/18 |
| Extension | % | 453/398 |
| Resistance to tear propagation | N/mm | 36/36 |
| Tensile strength after 500 hours (h) at 120° C., long./trans. | MPa | 19/17 |
| Extension after 500 h at 120° C., long./trans. | % | 402/353 |

TABLE 2-continued

| TESTS | | Test Values |
|---|---|---|
| Tensile strength after weathering test for 1000 h in cycles 3 min. wet, 17 min. dry | MPa | 15/14 |
| Extension after weathering test, 1000 h, 3 min. wet, 17 min. dry | % | 303/296 |
| Extension after 500 h of xenon exposure | % | 176/202 |
| Extension after 336 h at 100° C. plus 500 h xenon exposure | % | 312/336 |
| Bending strength, long./trans. | N | 5/4 |
| Bending strength after 500 h at 120° C., long./transv. | N | 5/5 |
| Pitting resistance after 5 min. at 170° C. | | no detectable change |
| Weight loss after 5 min. at 170° C. | % | 0.11 |
| Dimensional changes after 5 min. at 170° C., long./trans. | % | −3.9/+0.27 |
| Dimensional changes after 5 min. at 90° C., long./transv. | % | −0.7/+0.04 |
| Ball drop after 16 hours at −40° C., DIN 53 443 | | all samples undamaged |
| Max. rate burning behavior, MVSS-302 | | 30.5 mm/min |
| Color fastness after 500 h of xenon exposure, DIN 54001 | | 5 |
| Color fastness after 500 h at 120° C., DIN 54001 | | 5 |
| Extractable components after 16 h ether exposure, % wt. loss | | 4.0 |
| Extractable components after 7 days at 120° C. and 16 h ether exposure, % wt. loss | | 4.4 |
| Extractable components after 500 h xenon exposure and 16 h ether exposure, % wt. loss | | 3.6 |

It will be understood that the specification and examples are illustrative but not limitative of the present invention in that other embodiments within the spirit and scope of the invention will suggest themselves to those skilled in the art.

What is claimed is:

1. A process for producing a deep-drawn article from a partially-crystalline polymeric material, comprising:
   providing a partially-crystalline polymeric material in film form;
   heating the film-form material to a temperature below the melting point of its crystallites;
   surface embossing the so-heated material;
   cooling the embossed material;
   crosslinking the cooled material;
   reheating the then-crosslinked material, this time to a temperature above the melting point of its crystallites; and
   deep drawing the reheated material into the shape of an article.

2. The process of claim 1, wherein crosslinking the cooled material comprises irradiating the same with a high-energy beam of a power effective therefor.

3. The process of claim 2, wherein the high-energy beam comprises accelerated electrons.

4. The process of claim 2, wherein the power of the high-energy beam is from about 40 to about 80 kGy.

5. The process of claim 3, wherein the power of the high-energy beam is from about 40 to about 80 kGy.

6. The process of claim 1, wherein providing the partially-crystalline material comprises providing the same with, as a base substance, a predominant content of an ethylene-propylene copolymer or an ethylene-propylene-diene mixed polymer.

7. The process of claim 2, wherein providing partially-crystalline material comprises providing the same with, as a base substance, a predominant content of an ethylene-propylene copolymer or an ethylene-propylene-diene mixed polymer.

8. The process of claim 3, wherein providing partially-crystalline material comprises providing the same with, as a base substance, a predominant content of an ethylene-propylene copolymer or an ethylene-propylene-diene mixed polymer.

9. The process of claim 4, wherein providing partially-crystalline material comprises providing the same with, as a base substance, a predominant content of an ethylene-propylene copolymer or an ethylene-propylene-diene mixed polymer.

10. The process of claim 5, wherein providing partially-crystalline material comprises providing the same with, as a base substance, a predominant content of an ethylene-propylene copolymer or an ethylene-propylene-diene mixed polymer.

11. The process of claim 6, wherein providing the partially-crystalline material further comprises providing the same containing, in addition to the base substance, a uniformly-incorporated content of an elasticizing polymeric material that can be crosslinked by radiation.

12. The process of claim 6, wherein providing the partially-crystalline material further comprises providing the same containing, in addition to the base substance, a uniformly-incorporated content of an elasticizing polymeric material which can be crosslinked by radiation.

13. The process of claim 8, wherein providing the partially-crystalline material further comprises providing the same containing, in addition to the base substance, a uniformly-incorporated content of an elasticizing polymeric material which can be crosslinked by radiation.

14. The process of claim 9, wherein providing the partially-crystalline material further comprises providing the same containing, in addition to the base substance, a uniformly-incorporated content of an elasticizing polymeric material which can be crosslinked by radiation.

15. The process of claim 10, wherein providing the partially-crystalline material further comprises providing the same containing, in addition to the base substance, a uniformly-incorporated content of an elasticizing polymeric material which can be crosslinked by radiation.

* * * * *